United States Patent Office 2,960,356
Patented Nov. 15, 1960

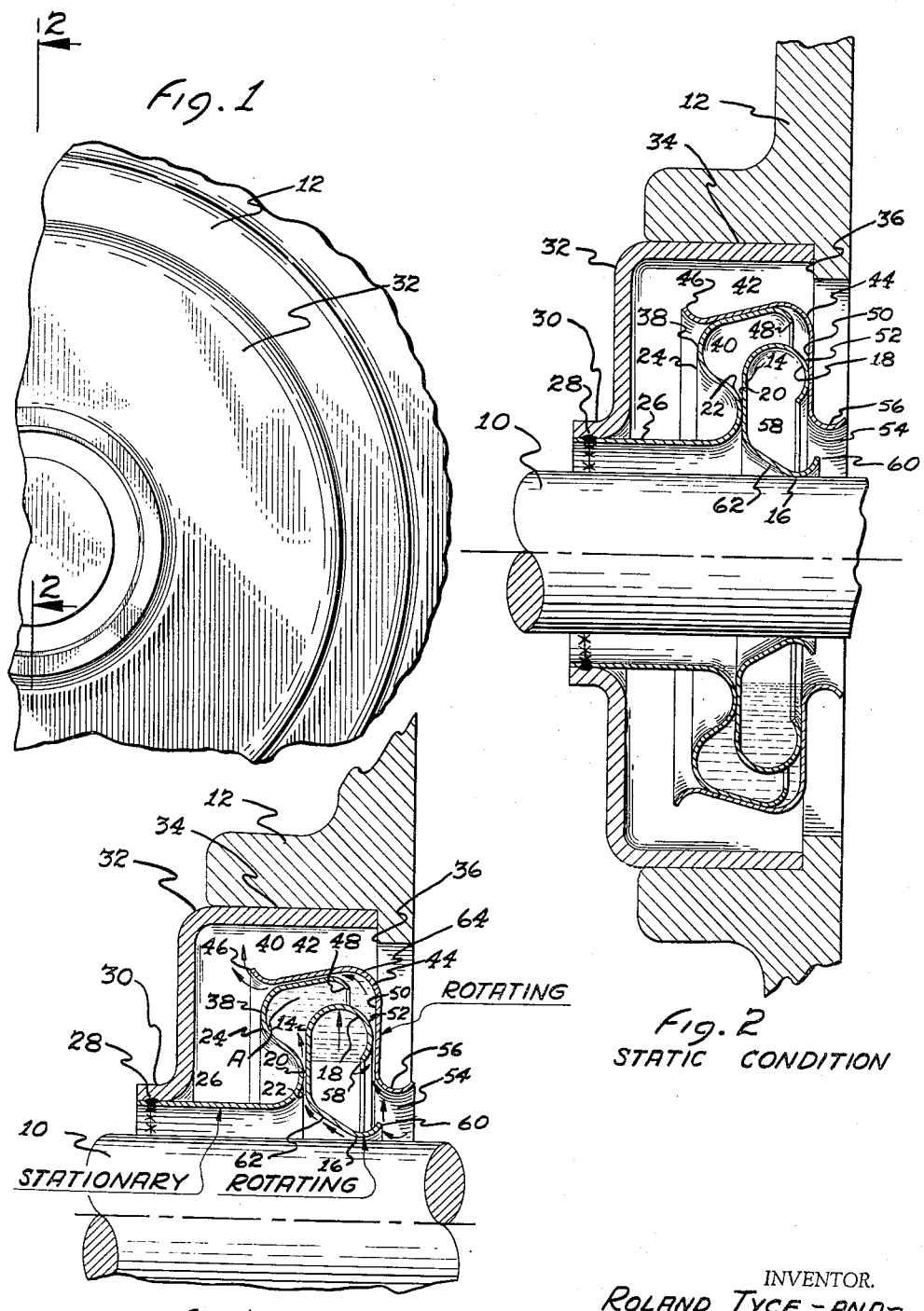

2,960,356

HYDRODYNAMIC ROTARY SHAFT SEALS

Roland Tyce, Chula Vista, and Walter T. Czuba, Los Gatos, Calif., assignors to Tyce Engineering Corporation, Chula Vista, Calif., a corporation of California Filed Mar. 6, 1959, Ser. No. 797,784

9 Claims. (Cl. 286—10)

This invention relates to hydrodynamic rotary shaft seals and more particularly to hydrodynamic rotary shaft seals which are useful in retaining oil around a rotating shaft which projects from the interior of an oil containing machine housing.

This application is a continuation in part of application Serial Number 688,077, filed October 3, 1957, now abandoned.

It is well known that centrifugal slingers mounted on rotating shafts are efficient devices for the prevention of the passage of oil around a rotating shaft. However, such slingers have heretofore been incapable of preventing the leakage of oil axially of the shaft when in static condition. This is due to the fact that a slinger requires slight clearance relative to adjacent parts so that it may centrifugally disperse oil radially of the shaft.

Accordingly, it is an object of applicants' invention to provide a rotating slinger driven hydraulically by a rotating shaft which slinger operates between a pair of opposed resilient members which are deflectable by hydraulic pressure away from the slinger member and which overlap each other at a location surrounding the slinger whereby the resilient character of these members permits them firmly to engage each other and opposite surfaces of the slinger member when in static condition thereby forming tightly engaged sealed surfaces about a shaft which extends through the side wall of a fluid containing machine housing.

Another object of the invention is to provide a hydrodynamic rotary shaft seal which comprises a slinger member normally pressed on the periphery of a rotatable shaft, said slinger member having an annular channel about its periphery adapted centrifugally to contain fluid dispelled from the shaft whereby dynamic pressure of the fluid in the channel causes radial deflection of the slinger about its entire periphery thereby springing the central portion of the slinger slightly away from the shaft in order to permit differential speeds of the shaft and the slinger in accordance with the hydraulic shear factor of fluid between the shaft and the slinger cylinder.

Another object of the invention is to provide a hydrodynamic rotary shaft seal wherein a slinger member is provided with an annular channel around its periphery adapted to receive fluid under dynamic pressure which causes radial deflection of the slinger member thereby permitting it to be rotated by the shaft only in accordance with the shear factor of oil between the slinger and the shaft so that the slinger may operate at a lower speed than the shaft and thereby run adjacent to other seal surfaces at a speed much lower than the rotating speed of the shaft.

Another object of the invention is to provide a hydrodynamic rotary shaft seal which is particularly adapted for use in connection with high speed machinery such as turbines or the like in which shafts may rotate, for example, at speeds up to one hundred thousand r.p.m.

Another object of the invention is to provide a hydrodynamic rotary shaft seal which is very durable due to the fact that all of the parts of the seal are deflected apart by hydraulic pressure when the seal is in operation and the parts contract into firm engagement with each other only when in static condition.

Another object of the invention is to provide a hydrodynamic rotary shaft seal which is particularly adapted to operate at high temperatures, due to the fact that the parts of the seal when operating do not rub, and may be made of various materials which will resist the effects of high temperatures.

Another object of the invention is to provide a hydrodynamic rotary shaft seal wherein all of the parts, when in operation, float in fluid whereby an eccentric relation of the shaft and seal support is readily accommodated.

Further objects and advantages of the invention may be apparent from the following specification, appended claims and accompanying drawings forming a part of this application in which:

Fig. 1 is a fragmentary end view of the machine housing showing a hydrodynamic rotary shaft seal therein and disposed in surrounding relationship with a rotating shaft.

Fig. 2 is an axial sectional view taken from the line 2—2 of Fig. 1 showing the shaft seal of the present invention in static condition; and Fig. 3 is a fragmentary sectional view similar to Fig. 2 but showing the shaft seal of the present invention in operating condition wherein the dynamic forces of centrifugally dispersed oil hold the relatively moving parts slightly separated from each other.

As shown in Fig. 2 of the drawings the seal of the invention is adapted to operate around the periphery of a shaft 10 rotatably mounted in a machine housing 12. This housing 12 may contain any type of machinery requiring lubricating oil or other fluids therein. The seal of the invention surrounds the shaft 10 and prevents the escape of fluids axially of the shaft and outwardly of the housing 12.

A slinger member 14 is mounted on the periphery of the shaft 10 and is provided with an arcuate in cross section annular ring portion 16 which is normally tightly engaged with the shaft 10. The shaft engaging surface of the ring portion 16 is burnished to a fine finish. The slinger 14 at its ring portion 16 is normally slightly smaller than the shaft 10 whereby the slinger 14 is pressed onto the shaft 10 when being installed. Thus, the slinger 14 when in static condition seizes the shaft tightly. The periphery of the slinger member 14 is provided with an annular channel 18 which is adapted to receive centrifugally dispersed fluid and thereby impose radial stresses in the structure of the slinger member whereupon radial deflection thereof occurs at a predetermined speed of the shaft 10 causing the ring portion 16 of the slinger member to be deflected slightly away from the shaft 10 thereby creating slight clearance between the shaft 10 and the ring 16 as shown in Fig. 3 of the drawings and which will be hereinafter described in detail. The channel portion 18 of the slinger member is provided with an outer surface 20 which is normally tightly engaged by an adjacent surface 22 of a resilient seal member 24. This resilient seal member 24 is provided with a cylindrical sleeve portion 26 welded at 28 to an annular hub portion 30 of a seal housing 32 which is a substantially cup shaped member pressed into an annular socket 34 disposed concentrically of the shaft 10. This socket is provided with a shoulder 36 forming an abutment for the inner end of the seal housing 32 when pressed into the annular socket 34 of the machine housing 12. Thus, the resilient seal member 24 is fixed relative to the machine housing 12 and is sealed at the weld 28 within the seal housing 32.

The surface 22 of the resilient seal member 24 which engages the surface 20 of the slinger member 14 is an arcuate surface and is annular as shown best in Fig. 2 of the drawings. This annular surface 22 firmly engages the annular surface 20 of the slinger member 14 when the seal is in static condition as shown in Fig. 2 of the drawings. This engagement prevents the leakage of oil between the slinger member 14 and the resilient seal 24 which is made of resilient material capable of being deflected away from the slinger member 14 when subjected to dynamic forces imposed by fluid centrifugally expelled from the slinger 14 as will be hereinafter described in detail.

The resilient seal member 24 outwardly of the annular curved surface 22 is provided with another annular curved surface 38 which extends into a frusto-conical portion 40 of the resilient seal member 24. This frusto-conical portion 40 converges toward the seal housing 32.

Engaging the frusto-conical portion 40 is a second frusto-conical portion 42 of a resilient seal member 44. The frusto-conical portion 42 conforms with the frusto-conical portion 40 and is resiliently loaded thereagainst. The frusto-conical portion 42 is provided with a curved lip 46 which is directed outwardly while the frusto-conical portion 40 is provided with an inwardly directed lip 48.

During installation of the frusto-conical portion 42 upon the portion 40 the lip 46 is engaged with the lip 48 and the resilient seal 44 is then pressed axially toward the housing 32 and is thus snapped over the resilient seal member 24. In this manner the resilient seal members 24 and 44 are assembled at opposite sides of the slinger 14. The resilient seal member 44 is provided with an inner surface 50 which is resiliently loaded against an outer arcuate surface 52 of the slinger 14. These engaged positions of the parts as hereinbefore described are normal to a static condition of the seal wherein all of the parts are stationary and engaged for the purpose of retaining oil within the housing and preventing it from escaping around the shaft and outwardly of the housing 12.

The frusto-conical structures of the resilient seal members 24 and 44 tend to hold the surfaces 22 and 50 of the resilient seals 24 and 44 in engagement with opposed surfaces 20 and 52, respectively of the slinger member 14.

The resilient seal 44 is provided with a central opening 54 surrounded by an annular arcuate portion 56 inwardly of the engaging surfaces 50 and 52.

The slinger member 14 at the edge of its channel shaped annular portion 18 is provided with a lip 58 over which centrifugally dispersed fluid may spill so that such fluid in excess of a predetermined amount may pass between the surfaces 50 and 52 as will be hereinafter described.

The slinger member 14 at its shaft engaging ring portion 16 is provided with an outwardly directed annular lip 60 which is disposed to sling oil centrifugally away from the shaft 10 and inwardly of the annular lip 56 of the resilient seal 44 whereby the channel 18 may be centrifugally filled with oil when operation of the seal is initiated as will be hereinafter described in detail.

Interconnecting the annular surface 20 of the slinger 14 and its shaft engaging ring portion 16 is an axially inclined surface 62 on which fluid travels radially after passing the slinger member 14 when in operation as will be hereinafter described in detail.

Operation

As shown in Fig. 3 of the drawings the seal of the invention is in operating condition wherein all of the relatively moving parts are separated by an oil film whereby none of the parts are in rubbing relationship with each other. This situation is particularly desirable in the operation of the fluid seal at very high speeds or at nominal speeds where long life and reliability of the seal is required.

When the shaft 10 is in static condition as shown in Fig. 2 of the drawings and rotation thereof is started, the shaft may be accelerated to a predetermined speed whereupon the lip 60 and the structure of the slinger 14 cause centrifugal displacement of oil from the shaft outwardly into the channel 18 and also between the surfaces 50 and 52 of the slinger 14 and resilient seal member 44, respectively. While the speed of the shaft increases the oil due to its dynamic centrifugal force flows between the resiliently engaged surfaces 50 and 52. The dynamic force of the oil presses these surfaces apart and flows into a chamber A formed by the resilient seal members 24 and 44 inwardly of their frusto-conical portions 40 and 42.

At a predetermined speed oil contained in the annular channel 18 of the slinger 14 causes radial stress in the slinger and consequent radial deflection sufficient to spring the ring portion 16 of the slinger 14 slightly away from the shaft 10 thereby creating a very slight clearance between the shaft and the slinger. This permits a very thin film of oil to exist between the slinger and the shaft. By this time sufficient dynamic force of centrifugally actuated fluid has occurred in the chamber A so that the frusto-conical portion 42 is forced slightly away from the frusto-conical portion 40. This is accomplished by pressure acting on the greatest radial extremity 64 of the frusto-conical structure 42 and also is permitted by the relative stiffness of the resilient seal members 24 and 44. Thus, the oil in the chamber A is continuously forced by centrifugal action of the slinger 14 which rotates with the shaft until the previously described separation of the ring 16 from the shaft, which permits the shaft to continue accelerating and eventually reach a somewhat higher speed than the slinger 14 which is then driven by the shear friction of the film of oil between the ring 16 and the shaft. Thus, the slinger continues to be driven by the shaft 10 but through the medium of hydraulic friction between the shaft and the ring portion 16 of the slinger 14. It will be understood that hydraulic pressure created by centrifugal force of the oil in the chamber A forces the resilient seal members 24 and 44 slightly apart so that there is slight clearance between the surfaces 20 and 22 of the slinger 14 and resilient seal member 24, respectively. Likewise, hydraulic pressure in the chamber A causes the resilient seal member 44 at its surface 50 to be forced slightly away from the adjacent surface 52 of the slinger member 14. Thus, the seal of the invention when in operating condition is completely surrounded by lubricating fluid and all of the adjacent moving surfaces are covered by a film of oil and do not rub. This action permits the shaft and seal to operate at very high speeds without galling of the parts. Furthermore, the shaft 10 may rotate at a relatively higher speed than the slinger 14 thereby permitting the centrifugal forces generated by the slinger 14 to be relatively nominal at extremely high shaft speeds.

It will be seen from Fig. 3 of the drawings that the inclined annular surface 62 of the slinger 14 provides a path for a very slight film of oil which passes between the shaft and the ring portion 16 of the slinger 14. This film of oil which passes on the annular incline 62 of the slinger 14 moves radially between the surfaces 20 and 22 of the slinger 14 and resilient seal member 24, respectively. This oil which passes between the surfaces 20 and 22 is dispersed into the chamber A wherein the periphery of the sleeve 14 causes centrifugal action of the oil thereby creating sufficient hydraulic pressure at the portion 64 of the frusto-conical structure 42 to cause separation of it from the frusto-conical structure 40 of the resilient seal member 24 thus permitting escape of oil from the chamber A outwardly into the interior of the seal housing 32 which communicates directly with the interior of the machine housing 12.

When the frusto-conical structures 40 and 42 are separated the resilient seal member 44 is permitted to rotate around the resilient seal member 24 in response to the whirling action of fluid in the chamber A.

When rotation of the shaft 10 is stopped the centrifugal force acting in the chamber 18 of the slinger 14 ceases to apply radial stress on the slinger 14 and permits the resilient structure of the slinger 14 at its ring portion 16 to grip or seize the periphery of the shaft 10 thereby forming an efficient seal therearound. Additionally, when the shaft 10 ceases to rotate dynamic pressure in the chamber A ceases to apply pressure to the resilient seals 24 and 44 thereby permitting them to contract relative to each other in a frusto-conical telescopic relationship. The inclined surfaces of the frusto-conical portions 40 and 42 and the resilient structure of the resilient seal member 44 cause it to grip the periphery of the frusto-conical portion 40 on an axial incline and force the resilient seal member 44 at its surface 50 to engage the surface 52 of the slinger 14. Concurrently the resilient seal member 24 at its surface 22 engages the surface 20 of the slinger 14 due to a reduction of pressure in the chamber A and the resilient character of the seal member 24. Thus, when rotation of the shaft 10 ceases the frusto-conical surfaces 40 and 42 form an intimate seal while the surfaces 20 and 52 of the slinger 14 are closely engaged by the burnished surfaces of the resilient seal members 24 and 44. Thus, the seal when in static condition forms an efficient closure for the housing 12 around the shaft 10 and as shown in Fig. 2 of the drawings all of the parts are intimately engaged to prevent the escape of oil around the shaft 10.

It will be obvious to those skilled in the art that various modifications of the present invention may be resorted to in a manner limited only by a just interpretation of the following claims.

We claim:

1. In a hydrodynamic rotary shaft seal for a fluid containing machine housing the combination of: a housing; a rotary shaft therein; a slinger ring frictionally engaged in surrounding disposition on said shaft and normally in lightly fitted engagement therewith, said ring having an annular channel extended radially from said shaft and disposed to receive fluid force centrifugally from said shaft, whereby dynamic force of said fluid in said annular channel causes diametric deflection of said ring permitting said shaft to float freely therein whereupon said ring is then driven by the friction of oil between said shaft and said ring, and a resilient member disposed normally to react axially of said shaft and to engage said ring when in static condition to form a seal surface engagement with said ring, said resilient member disposed to be deflected axially of said shaft and away from said ring by fluid forced centrifugally away from the axis of said shaft when it rotates at a predetermined speed.

2. In a hydrodynamic rotary shaft seal for an oil containing machine housing the combination of: an oil containing housing; a rotating shaft therein; a slinger ring frictionally engaged on said ring having an annular channel extended radially from said shaft and disposed to receive the dynamic force of oil centrifugally dispersed thereagainst to cause diametric deflection of said ring permitting said shaft to rotate freely therein; axially spaced resilient members engaging said annular channel shaped portion of said seal ring in opposed relationship to each other, said resilient members forming an annular chamber outwardly of said channel shaped portion of said seal ring.

3. In a hydrodynamic rotary shaft seal for an oil containing machine housing the combination of: an oil containing housing; a rotating shaft therein; a slinger ring frictionally engaged on said shaft and normally in tightly fitted engagement therewith, said ring having an annular channel extended radially from said shaft and disposed to receive the dynamic force of oil centrifugally dispersed thereagainst to cause diametric deflection of said ring permitting said shaft to rotate freely therein; axially spaced resilient members engaging said annular channel shaped portion of said seal ring in opposed relationship to each other, said resilient members forming an annular chamber outwardly of said channel shaped portion of said seal ring, one of said resilient members mounted stationarily relative to said oil containing housing and the other of said resilient members being annular and having an annular portion surrounding a stationary resilient member and rotatable relative thereto whereby viscous drag of oil between said shaft and said seal ring causes it to rotate and whereby viscous drag of oil between said seal ring and said rotatable resilient member causes it to rotate relative to the stationary resilient member.

4. In a hydrodynamic rotary shaft seal for an oil containing machine housing the combination of: an oil containing housing; a rotating shaft therein; a slinger ring frictionally engaged on said shaft and normally in tightly fitted engagement therewith, said ring having an annular channel extended radially from said shaft and disposed to receive the dynamic force of oil centrifugally dispersed thereagainst to cause diametric deflection of said ring permitting said shaft to rotate freely therein; axially spaced resilient members engaging said annular channel shaped portion of said seal ring in opposed relationship to each other, said resilient members forming an annular chamber outwardly of said channel shaped portion of said seal ring, one of said resilient members mounted stationarily relative to said oil containing housing and the other of said resilient members being annular and having an annular portion surrounding a stationary resilient member and rotatable relative thereto whereby viscous drag of oil betweeen said shaft and said seal ring causes it to rotate and whereby viscous drag of oil between said seal ring and said rotatable resilient member causes it to rotate relative to the stationary resilient member, said resilient members deflectable slightly away from said annular seal ring at its annular channel portion when oil pressure in said chamber outwardly thereof increases to a predetermined value.

5. In a hydrodynamic rotary shaft seal for an oil containing machine housing the combination of: an oil containing housing; a rotating shaft therein; a slinger ring frictionally engaged on said shaft and normally in tightly fitted engagement therewith, said ring having an annular channel extended radially from said shaft and disposed to receive the dynamic force of oil centrifugally dispersed thereagainst to cause diametric deflection of said ring permitting said shaft to rotate freely therein; axially spaced resilient members engaging said annular channel shaped portion of said seal ring in opposed relationship to each other, said resilient members forming an annular chamber outwardly of said channel shaped portion of said seal ring, said annular channel of said seal ring being open toward the inner side of said oil containing housing.

6. In a hydrodynamic rotary shaft seal for an oil containing machine housing the combination of: an oil containing housing; a rotating shaft therein; a seal ring frictionally engaged on said shaft and normally in tightly fitted engagement therewith, said ring having an annular channel extended radially from said shaft and disposed to receive the dynamic force of oil centrifugally dispersed thereagainst to cause diametric deflection of said ring permitting said shaft to rotate freely therein; axially spaced resilient members engaging said annular channel shaped portion of said seal ring in opposed relationship to each other, said resilient members forming an annular chamber outwardly of said channel shaped portion of said seal ring.

7. In a hydrodynamic rotary shaft seal for an oil containing machine housing the combination of: an oil containing housing; a rotating shaft therein; a seal ring frictionally engaged on said shaft and normally in tightly fitted engagement therewith, said ring having an annular channel extended radially from said shaft and disposed to receive the dynamic force of oil centrifugally dispersed thereagainst to cause diametric deflection of said ring permitting said shaft to rotate freely therein; axially spaced resilient members engaging said annular channel shaped portion of said seal ring in opposed relationship to each other, said resilient members forming an annular chamber outwardly of said channel shaped portion of said seal ring, one of said resilient members mounted stationarily relative to said oil containing housing and the other of said resilient members being annular and having an annular portion surrounding a stationary resilient member and rotatable relative thereto whereby viscous drag of oil between said shaft and said seal ring causes it to rotate and whereby viscous drag of oil between said seal ring and said rotatable resilient member causes it to rotate relative to the stationary resilient member.

8. In a hydrodynamic rotary shaft seal for an oil containing machine housing the combination of: an oil containing housing; a rotating shaft therein; a seal ring frictionally engaged on said shaft and normally in tightly fitted engagement therewith, said ring having an annular channel extended radially from said shaft and disposed to receive the dynamic force of oil centrifugally dispersed thereagainst to cause diametric deflection of said ring permitting said shaft to rotate freely therein; axially spaced resilient members engaging said annular channel shaped portion of said seal ring in opposed relationship to each other, said resilient members forming an annular chamber outwardly of said channel shaped portion of said seal ring, one of said resilient members mounted stationarily relative to said oil containing housing and the other of said resilient members being annular and having an annular portion surrounding a stationary resilient member and rotatable relative thereto whereby viscous drag of oil between said shaft and said seal ring causes it to rotate and whereby viscous drag of oil between said seal ring and said rotatable resilient member causes it to rotate relative to the stationary resilient member, said resilient members deflectable slightly away from said annular seal ring at its annular channel portion when oil pressure in said chamber outwardly thereof increases to a predetermined value.

9. In a hydrodynamic rotary shaft seal for an oil containing machine housing the combination of: an oil containing housing; a rotating shaft therein; a seal ring frictionally engaged on said shaft and normally in tightly fitted engagement therewith, said ring having an annular channel extended radially from said shaft and disclosed to receive the dynamic force of oil centrifugally dispersed thereagainst to cause diametric deflection of said ring permitting said shaft to rotate freely therein; axially spaced resilient members engaging said annular channel shaped portion of said seal ring in opposed relationship to each other, said resilient members forming an annular chamber outwardly of said channel shaped portion of said seal ring, said annular channel of said seal ring being open toward the inner side of said oil containing housing.

References Cited in the file of this patent
UNITED STATES PATENTS

| 2,750,214 | Bermingham | June 12, 1956 |
| 2,888,281 | Ratti | May 26, 1959 |